United States Patent
Hayes et al.

(10) Patent No.: US 6,264,263 B1
(45) Date of Patent: Jul. 24, 2001

(54) MANEUVERABLE SUN VISOR ARM

(76) Inventors: Christine Clare Hayes, 342 Mary Street, Richmond, Vic 3121; Damian Vincent Corcoran, 5 Jade Court, Narre Warren, Vic 3804, both of (AU)

(*) Notice: Subject to any disclaimer, the term of this patent is extended or adjusted under 35 U.S.C. 154(b) by 0 days.

(21) Appl. No.: 09/369,613

(22) Filed: Aug. 6, 1999

(30) Foreign Application Priority Data

Aug. 6, 1998 (AU) .................................... PP5090

(51) Int. Cl.⁷ .................................. B60J 3/02; B60J 1/02
(52) U.S. Cl. .................... 296/97.11; 296/97.9; 296/97.13
(58) Field of Search .............................. 296/97.11, 97.9, 296/97.13

(56) References Cited

U.S. PATENT DOCUMENTS

| | | | |
|---|---|---|---|
| 1,275,311 | * | 8/1918 | Schumacher Schmalz ...... 296/97.11 |
| 1,461,289 | * | 7/1923 | Primrose ............................ 296/97.11 |
| 4,925,233 | * | 5/1990 | Clark ................................. 296/97.11 |
| 5,380,057 | * | 1/1995 | Wevers .............................. 296/97.11 |
| 5,499,854 | * | 3/1996 | Crotty, III et al. ............... 296/97.13 |
| 5,645,308 | * | 7/1997 | Fink ..................................... 296/97.9 |
| 5,653,490 | * | 8/1997 | Fink et al. ........................ 296/97.11 |
| 5,871,252 | * | 2/1999 | Gute ................................... 296/97.11 |

FOREIGN PATENT DOCUMENTS

| | | |
|---|---|---|
| 4210972 | 4/1992 | (DE) . |
| 2309678 | 5/1997 | (GB) . |
| WO 93/08998 | 5/1993 | (WO) . |

* cited by examiner

Primary Examiner—D. Glenn Dayoan
Assistant Examiner—Greg Blankenship
(74) Attorney, Agent, or Firm—Head, Johnson & Kachigian

(57) ABSTRACT

A maneuvrable sun visor arm for a vehicle is disclosed. The manoeuvrable sun visor arm has a first end to be mounted in a predetermined location and a second arm which is adapted to be connected to a sun visor. The second arm is movable substantially universally with respect to the predetermined location. The arm is further characterized as including a telescopic section having two or more telescoped sub arms adapted to releasably engage each other at a plurality of predetermined locations relative to one another.

The telescoped sub arms may be provided with complementary grooves and ridges adapted to inter engage. Openings or castellations may be provided adjacent to the ridges to permit the ridges to be flexed to disengage the ridges from any of the grooves.

11 Claims, 3 Drawing Sheets

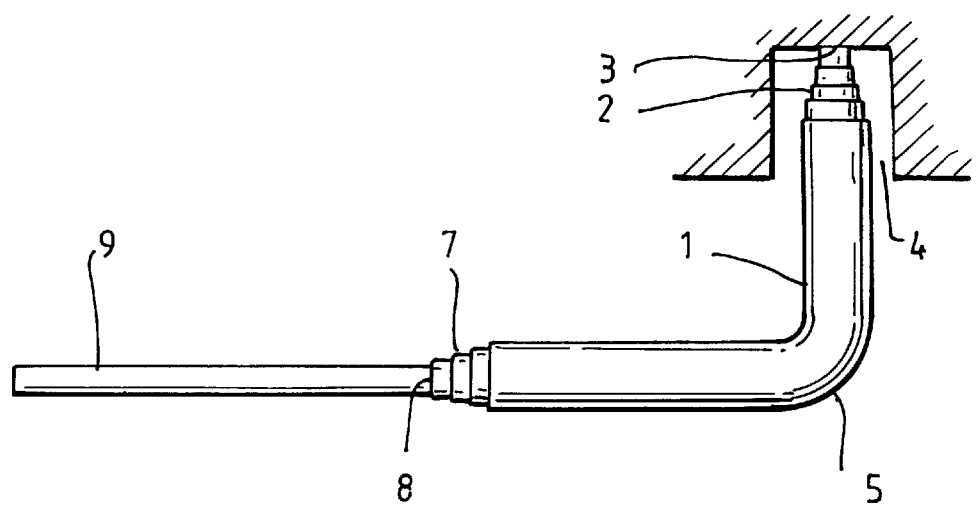
_FIG. 1._
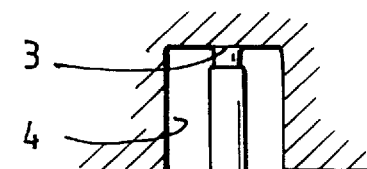
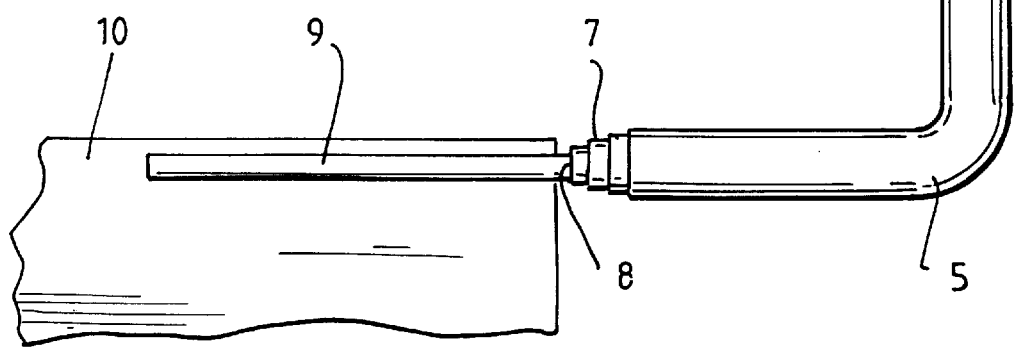
_FIG. 2._

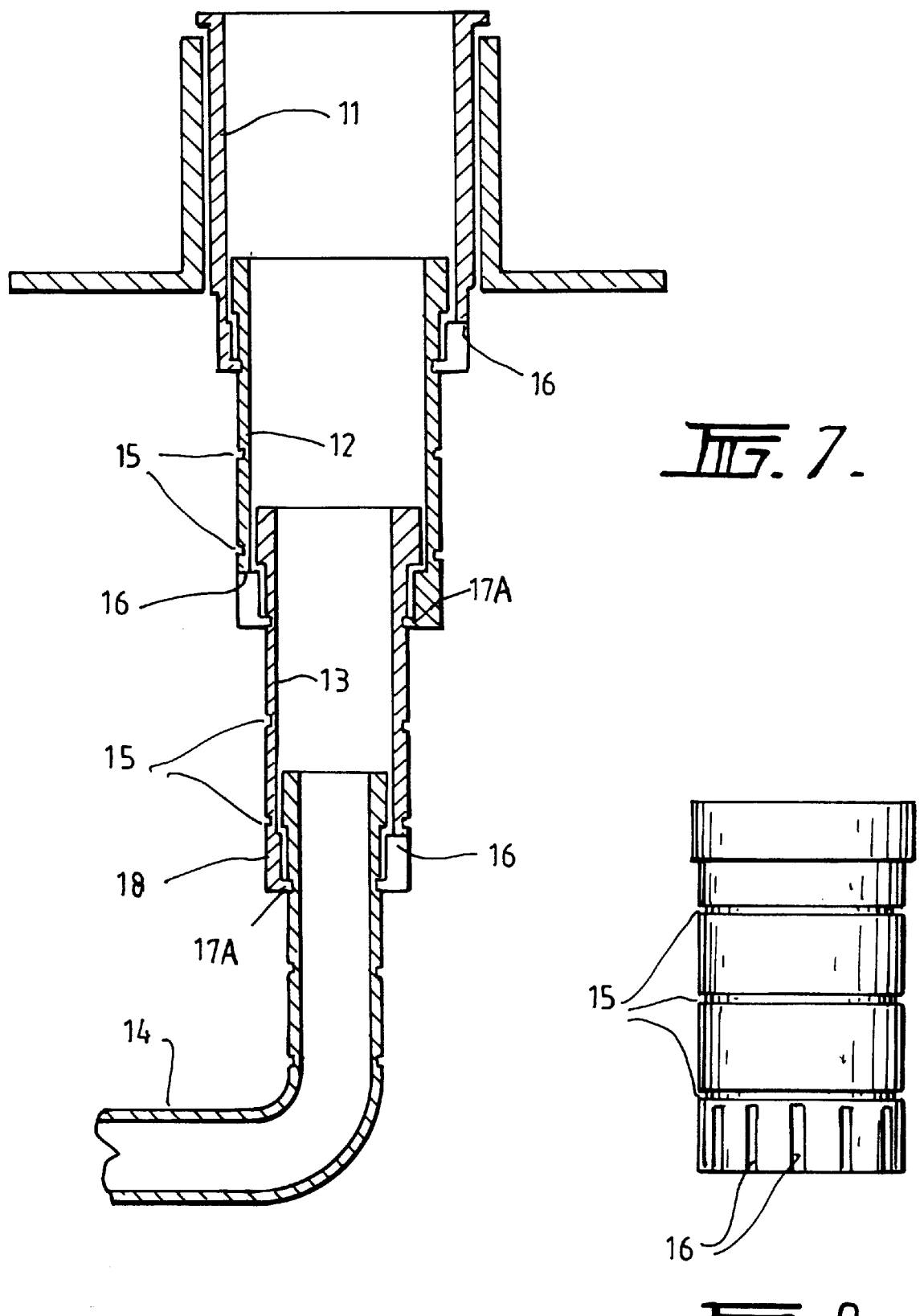

MANEUVERABLE SUN VISOR ARM

FIELD OF THE INVENTION

This invention relates to improvements in devices for shielding vision from sunlight and glare and shielding the face from ultra violet radiation.

BACKGROUND OF THE INVENTION

In vehicles, the restriction in movement of current sun visors can create both dangerous and uncomfortable situations.

Although sun visors are regularly remodelled in shape and size, the maneuvrability of sun visors remains limited. This is particularly problematic for drivers during the morning or evening with the sun low in the sky. Current vehicle sun visors cannot generally be extended to low enough positions to shield the eyes of many drivers from sunlight and glare extending through front windows thereby causing driver discomfort and reducing driver safety. This may also cause discomfort for passengers such as front seat passengers.

Additionally, drivers' and front seat passengers' faces are exposed to sunlight, glare and ultra violet radiation entering through side windows of vehicles. Current vehicle sun visors are not generally capable of being extended laterally to shield the face from this sunlight, glare and ultra violet radiation.

In research on sun visors having telescopic arms, issues have arisen concerning how to ensure these telescopic arms do not unexpectedly extend or change their position under normal driving conditions. Under such conditions the components of vehicles must have minimal or no rattle and the vibratory condition experienced when the vehicle goes over adverse terrain must be catered for.

SUMMARY OF THE INVENTION

The present invention accordingly provides in one embodiment a maneuvrable sun visor arm having a first end to be mounted in a predetermined location and a second arm which is adapted to be connected to a sun visor wherein the second arm is movable substantially universally with respect to that location, the arm further characterized as including a telescopic section having two or more telescoped sub arms adapted to releasably engage each other at a plurality of predetermined locations relative to one another.

Preferably, the telescoped sub arms are provided with complementary grooves and ridges adapted to inter engage. More preferably, openings or castellations are provided adjacent to the ridges to permit the ridges to be flexed to disengage the ridges from any of the grooves.

The complementary ridges and grooves may be provided on the inner surface or outer surface of respective sub arms.

In another preferred embodiment of the invention, the sub arms are prevented from disengaging one another by the provision of a rim or lug(s) located adjacent the ends of the sub arms.

The telescoped sub arms of the telescopic section of the visor arm are typically connected together at respective ends. Such connection permits the sub arms to be moved relative to each other.

Typically both sub arms are axially extendible. In this embodiment the sub arms may be a pair of rods with either one of the rods or both rods containing telescopic elements, enabling an attached sun visor to be maneuvred into various positions by extension and retraction of the telescopic rod or rods.

In one typical embodiment of the invention, keys may be provided so as to prevent the sub arms from rotating relative to one another.

The telescopic rod or rods may be shaped cylindrically or comprise one or more flat or curved sides. The downwardly oriented rod may be adapted to be attached at its first end to a rotational mounting. The rotational mounting may be flush with the surface to which it is attached or set back into a cavity.

The laterally oriented rod may be attached to a bar onto which a sun visor is placed via the sun visor's rotational mounting, or any other device suitable for fixing a sun visor.

The maneuvrable sun visor arm may be made of any suitable sturdy material.

The present invention provides in another separate embodiment a sun visor for a vehicle, the sun visor having a maneuvrable sun visor arm according to the invention connected thereto.

DESCRIPTION OF PREFERRED EMBODIMENT

To assist with understanding the invention reference will now be made to the accompanying drawings in which:

FIG. 1 is a side view of one form of sun visor arm;

FIG. 2 is a side view of the sun visor arm of FIG. 1 rotated into a shielding position and with one telescopic rod extended thereby lowering the sun visor into a suitable lower front window shielding position.

FIG. 7 is a cross sectional view of an alternate form of sun visor arm according to the invention in the extended position; and FIG. 8 is a side view of a sub arm of the visor arm of FIG. 7.

In the drawings like components and features are designated by the same numeral.

Figure 3:
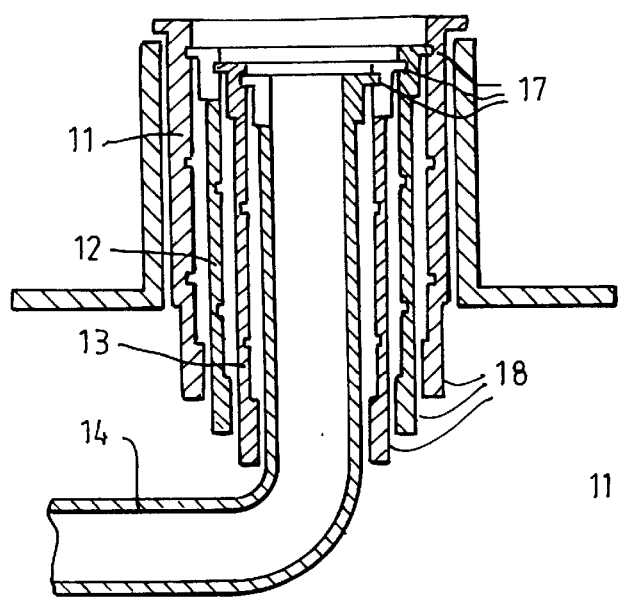
FIG. 3 is a cross sectional view of one form of sun visor arm according to the present invention in the collapsed position.
Figure 5:
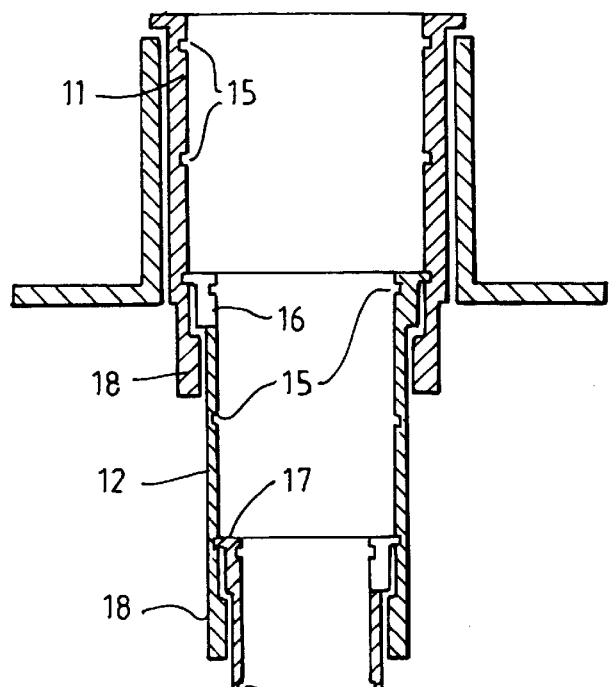
FIG. 5 is a side view of a sub arm of the visor arm of FIG. 4.
Figure 5:
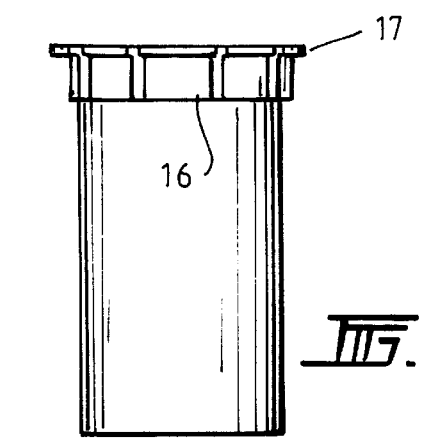

Referring to FIGS. 1 and 2, it can be seen that the maneuvrable sun visor arm comprises a telescopic rod I comprising one or more telescopic components 2. The rod 1 is affixed at its top end to a rotational mounting 3 which is set back into a cavity 4. The lower end of the rod 1 is connected via an angular joint 5 to a telescopic rod 6. Rod 6 is comprised of one or more telescopic components 7.

Rod 6 at its furthest end 8 from the angular joint 5, is affixed to a bar 9 onto which a sun visor 10 is placed via its rotational mounting. The attached sun visor 10 is rotated via the sun visor's rotational mounting and rotational mounting 3 into shielding positions on the front or side windows. It is then able to be manoeuvred downwards, upwards and laterally by extension and contraction of the telescopic rods 1 & 6 at the operator's discretion enabling the sun visor to be maneuvred into a variety of shielding positions.

In FIGS. 3 to 6, a particular arrangement according to the invention is shown. Four telescoped sub arms 11, 12, 13 and 14 are connected and each is provided with three spaced grooves 15 which are located on their inner surface. As clearly shown in FIG. 5, each sub arm has a castellated upper end 16 with an outwardly extending rim 17. Rim 17 locates into the grooves 15. The castellated end 16 allows the rim 17 to be flexed inwardly to disengage the grooves 15 when it is desired to extend or contract the visor arm. However, when the rim 17 is located in one of the grooves 15, the visor arm is held firmly in position and will withstand considerable force of the types experience by vehicles without disengaging prematurely.

Figure 4:
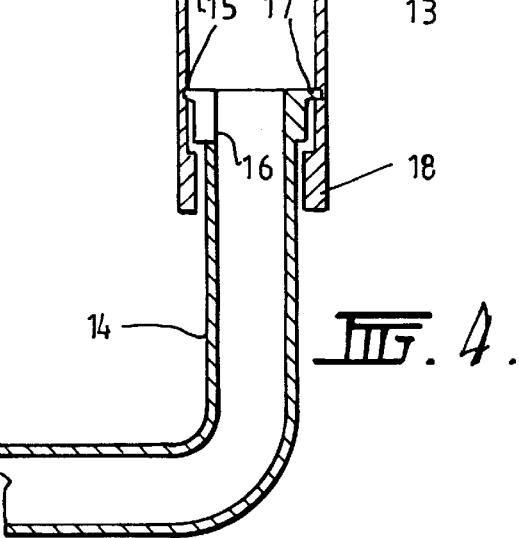
FIG. 4 is a cross sectional view of the sun visor arm of FIG. 3 in the extended position.

As it is also undesirable for the sub arms to become disengaged from one another, indents 18 are provided as shown in FIG. 4 to prevent this from happening.

Figure 6:
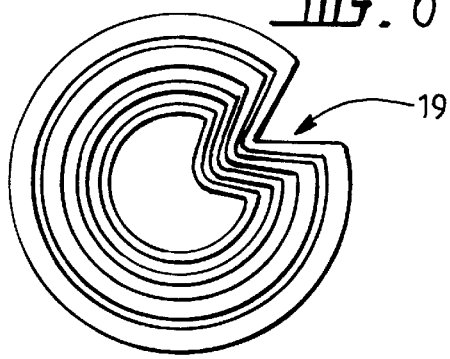
FIG. 6 is a plan view of the sun visor arm of FIG. 3.

To prevent the sub arms from rotating relative to one another, keys 19 are provided as shown in FIG. 6.

FIGS. 7 and 8 depict an alternative arrangement. In particular, the ridge 17A and groove 15 positions have been reversed. As will be clear from FIG. 8, the castellated end 16 is now at the lower end and instead of rim 17, a groove 15 has been added. Similarly, the rim 17 has been relocated on the inner surface of the sub arms.

Accordingly, the modified sun visor arm may be easily located in any desired position and maintained there even under adverse conditions until such time of the driver or passenger elects to reposition it.

The term "comprising" and forms of that term as used in this description and in the claims does not limit the invention to exclude variants or additions.

Modifications and variations will be readily apparent to those skilled in the art. It is intended that such modifications and variations will be within the scope of the invention.

What is claimed is:

1. A maneuverable sun visor arm having a first end to be mounted in a predetermined location and a second arm which is adapted to be connected to a sun visor wherein the second arm is movable substantially universally with respect to that location, the maneuverable sun visor arm further characterized as including a telescopic section having two or more telescopic sub arms with complementary ridges and grooves, to inter engage allowing the sub arms to releasably engaging each other at a plurality of predetermined locations relative to one another, wherein openings or castellations are provided adjacent to said ridges to permit said ridges to be flexed to disengage said ridges from any of said grooves.

2. A maneuvrable sun visor arm according to claim 1, wherein at least one of said sub arms is axially extendible.

3. A maneuvrable sun visor arm according to claim 1, wherein at least two of said sub arms are axially extendible.

4. A maneuvrable sun visor arm according to claim 1, wherein said telescopic sub arms comprise rods containing telescopic components to permit an attached sun visor to be maneuvred into various positions by extension and retraction of the telescopic rod or rods.

5. A maneuvrable sun visor arm according to claim 1, wherein said first end of said maneuvrable sun visor arm is attachable to a vehicle via a rotational mounting.

6. A maneuvrable sun visor arm according to claim 5, wherein said rotational mounting is set back into a cavity.

7. A maneuvrable sun visor arm according to claim 1, wherein said complementary ridges and grooves are provided on the inner surface or outer surface of respective sub arms.

8. A maneuverable sun visor arm according to claim 1, wherein said telescopic sub arms are prevented from disengaging one another by the provision of a rim or at least one lug located adjacent the ends of said sub arms.

9. A maneuvrable sun visor arm according to claim 1, further comprising a sun visor connected to said second arm.

10. A maneuvrable sun visor arm according to claim 9, wherein said second arm is attachable to a rod on which said sun visor is received.

11. A sun visor for a vehicle, the sun visor having a maneuvrable sun visor arm according to claim 1 connected thereto.

\* \* \* \* \*